April 28, 1959     L. BOUMA     2,883,964
MILKING MACHINE VACUUM SYSTEM CONSTRUCTION
Filed June 24, 1957
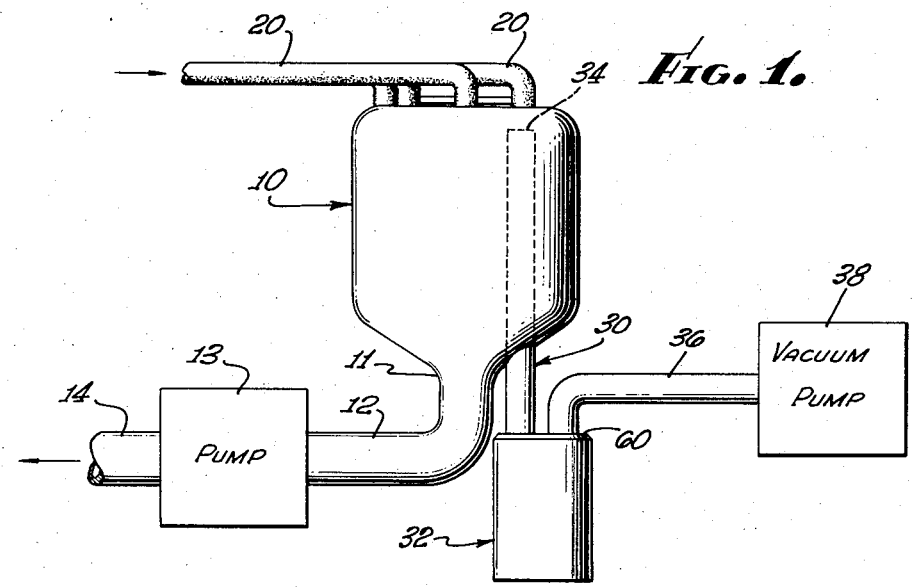
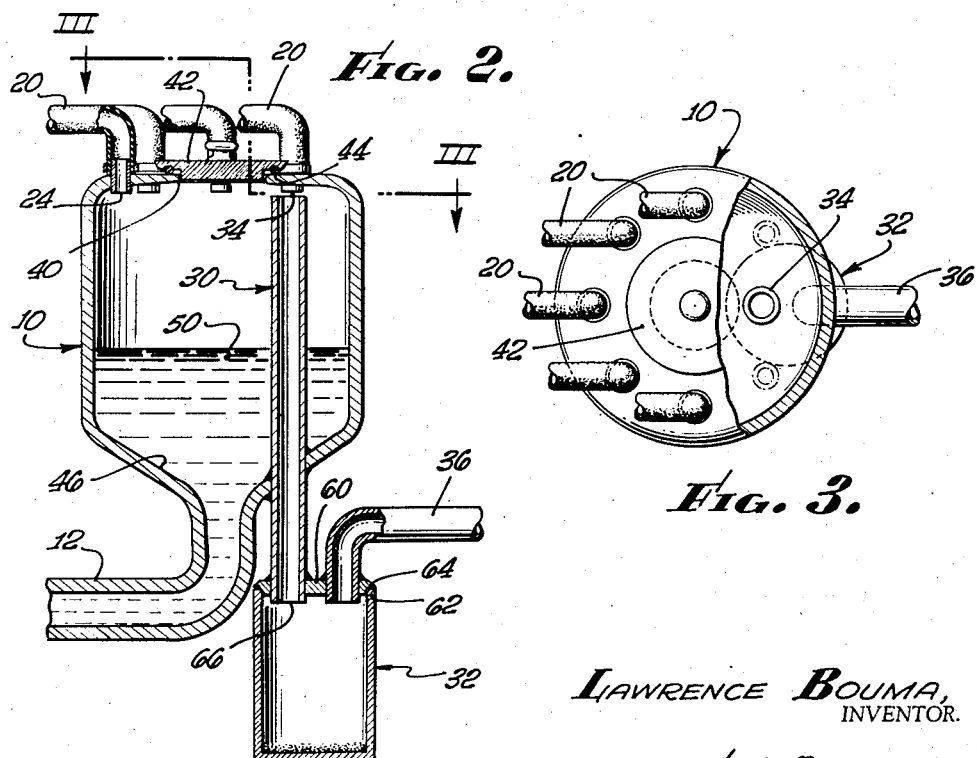
LAWRENCE BOUMA,
INVENTOR.
BY
ATTORNEYS.

2,883,964
MILKING MACHINE VACUUM SYSTEM CONSTRUCTION

Lawrence Bouma, Ontario, Calif.

Application June 24, 1957, Serial No. 667,365

2 Claims. (Cl. 119—14.46)

The present invention relates generally to milking machinery and more particularly to the arrangements of the vacuum lines used in the vacuum system of such machinery.

In the conventional milking machine construction a receiver or air separator is provided consisting of a container having a hollow chamber formed therein into which the milk from one or more milk lines is poured by means of pipes or conduits leading from the milking stalls. From the bottom of such receiver or air separator a line runs to the milk pump for further processing or the filling of containers for storage or delivery of the milk. During normal operation the receiver contains a varying quantity of milk. The receiver is equipped with a vacuum line leading to a vacuum pump which serves to maintain a sub-atmospheric pressure in the milk lines coming from the milking stalls. According to present construction the vacuum line is attached to the receiver in the upper portion thereof with its open end located well above the highest expected milk level in the receiver. From its open end it leads upwardly through the top of the receiver and thence downwardly along a downwardly inclined pipe to a moisture trap from which a line leads to the vacuum pump.

The conventional construction as above briefly described has a serious disadvantage in that the vacuum line attached to the upper portion of the receiver or air separator must, in accordance with conventional sanitary regulations, include a downwardly inclined path away from the receiver to insure that possible contaminants are not permitted to enter the receiver from the vacuum line. In turn, this requires the use of so-called "sanitary L's" which are used in pairs, one such L being formed at an angle of about 95° and the other at an angle of 85°. These L's are relatively expensive in construction, difficult to clean and also disadvantageous in that they introduce into the vacuum line a number of turns which has the result of increasing the fluid friction therein.

According to my invention, there is provided a vertically oriented vacuum line within the receiver or air separator, the line passing through the bottom of the separator and terminating upwardly a suitable, preferably short, distance below the top of the receiver. The vacuum line must be positioned in such a way as not to be in vertical alignment with any of the incoming milk lines, so that no milk can enter the vacuum line. Moreover, according to a preferred construction in accordance with the present invention, the vacuum line extends beneath the receiver and is connected directly to the moisture trap which is conventionally required and used in such installations. Thus the path of air flow in the vacuum line from the receiver to the moisture trap is straight, thereby minimizing the fluid friction in the vacuum line. Moreover, there is no possibility of the leakage or dripping of contaminants from the vacuum line into the milk in the receiver, since the open end of the vacuum line within the receiver is directed upwardly.

Accordingly it is an object of the present invention to provide a novel arrangement of the vacuum line in the receiver of a milking machine.

Another object of the invention is to disclose an arrangement of the vacuum line in a milking machine wherein such line extends upwardly in the interior of a receiver to within a short distance of the top of the receiver and projects downwardly through the bottom of the receiver in a virtually straight line to the moisture trap downstream of the receiver.

These and other and allied objects and purposes of the invention will become clear from a study of the following description of preferred embodiments thereof taken in connection with the accompanying drawing, in which:

Fig. 1 is a diagrammatic flow sheet showing the principal components in the portion of the milk treatment system to which the present invention pertains.

Fig. 2 is a side view, chiefly in section, showing a typical arrangement of the receiver and moisture trap embodying the present invention.

Fig. 3 is a view taken on line III—III of Fig. 2.

Referring now in detail to the drawing and first to Fig. 1 thereof, there is shown a receiver indicated generally at 10 to which milk is fed by vacuum from a source of milk such as the conduits 20 leading from milking machines (not shown). It may be noted by way of clarification that the receiver 10 is also sometimes known in the art as an "air separator" and also as a "vacuum pan." From the bottom 11 of receiver 10 a conduit 12 may lead to a pump 13 and downstream of the pump a conduit 14 may lead to further processing equipment or to conventional packaging or other disposition of the milk.

Means are provided for maintaining a sub-atmospheric air pressure within the receiver 10. In the present illustration such means include a vacuum line indicated generally at 30 extending downwardly from the bottom of the receiver to a moisture trap indicated generally at 32 and upwardly within the receiver to terminate at 34, which is substantially above the level of milk permitted to exist within the receiver 10. Moreover, the upper point 34 of the vacuum line 30 is laterally displaced well away from vertical alignment with the inlet openings of the milk lines 20, so that no milk entering the receiver from such lines will enter the upper end of the vacuum pipe 30.

Means are provided for maintaining a sub-atmospheric or suction pressure in the moisture trap 32 and are here shown as including a fluid conduit 36 leading to a conventional vacuum pump 38.

The physical construction according to the preferred embodiment of the present invention will be better understood by reference to Figs. 2 and 3 of the drawing wherein corresponding parts are designated by the same reference characters as heretofore used in connection with Fig. 1.

Receiver 10 is conventionally made of either glass, stainless steel or other rigid smooth-surfaced material which is completely inert to the presence of milk. For sanitary reasons the interior of the receiver must be readily reached for cleaning, and the receiver is thus provided with a wide top opening 40 which is closable by a suitable cover member of conventional construction 42 desirably provided with a sealing gasket 44 of rubber or the like material. In the usual case, suction pressure will exist within the receiver 10 and consequently no elaborate means are needed for maintaining the cover 42 in its sealing position as shown. Conventionally the bottom inner surface 46 of receiver 10 is formed in frusto-conical shape as illustrated to facilitate the flow of milk downwardly and outwardly of receiver 10 through conduit 12.

In operation a quantity of milk 50 is contained within receiver 10, and the milk is drawn downwardly and outwardly through conduit 12 by means of a suitable pump so that the level of the milk 50 within the receiver is never permitted to rise higher than a predetermined point which may be approximately half of the height of the receiver 10.

Within the receiver 10 the vacuum pipe 30 extends through the bottom 46 of the receiver up to the top 34, terminating upwardly well above the level of the milk 50 within the receiver and desirably only a short distance— one or two inches—below the top wall of the receiver. Moreover, the upper end 34 of the vacuum pipe 30 is displaced laterally from the inner ends 24 of the milk lines 20 so that there is virtually no possibility of liquid milk entering the vacuum pipe 30. It is to be especially observed that the entire length of the vacuum pipe 30 is straight, without bends or angles therein which increase the difficulty of thoroughly cleaning the equipment to satisfy sanitary requirements and also serve to add to the fluid friction to be overcome in drawing a vacuum through the pipe 30.

Means are provided for applying a sub-atmospheric pressure or vacuum suction on the lower end of vacuum pipe 30, and in the present illustration such means include the moisture trap 32 previously referred to which comprises a closable container having a top 60 adapted to rest upon the upper edge 62 of the moisture trap and desirably provided with suitably hermetically sealing means 64 such as an O-ring or equivalent. The lowermost end 66 of vacuum pipe 30 projects through an opening formed in the cover 60 and terminates immediately therebelow. A conduit 36 communicates with the upper portion of the interior of moisture trap 32 and extends to a vacuum pump or similar mechanism for exerting a suction pressure in the line 36 and thereby the vacuum pipe 30. It will be readily observed that the moisture trap 32 is the conventionally used device for collecting whatever small amount of moisture and condensation which may be picked up by the vacuum pipe 30, and the moisture trap 32 is thoroughly cleaned periodically in order to preserve sanitary conditions throughout the entire treatment process of the milk.

It will be understood that the precise details of construction of the receiver 10, the entering milk conduits 20 and 22 and the effluent milk conduit 12, as well as of the moisture trap 32 and the conduit 36 leading to the vacuum pump 38 are well known in the art and are not discussed in detail herein since they form no direct part of the present invention. It is an important feature of the invention that the vacuum pipe 30 projecting upwardly into the interior of the receiver 10 furnishes a vertically oriented, virtually straight line for the downward passage of air under suction pressure as previously described so that loss of pressure due to fluid friction is minimized, cleaning operations are facilitated, and possible contamination of the milk 50 within the receiver by drippage from the vacuum line 30 is virtually completely eliminated. Another important characteristic of the invention is that the present construction lends itself very well to the location of the moisture trap 32 immediately beneath the receiver 10 so that the vacuum pipe 30 can extend in its straight line directly to the moisture trap.

Modifications and changes from the illustrative forms of the components of the invention are contemplated and are intended to be embraced in the scope of the appended claims.

I claim:

1. In a system for receiving milk under partial vacuum from a source and delivering it for further processing, in combination: a receiver consisting of a hollow container hermetically closable by a cover member; a milk supply conduit from a milk source feeding downwardly into the receiver; an effluent conduit communicating with the interior of the receiver through an opening in the bottom thereof; a moisture trap comprising an enclosed chamber beneath the receiver; a vertically oriented vacuum pipe extending upwardly through the bottom of the receiver to a point substantially above the maximum permissible milk level in the receiver and spaced laterally from the inlet opening of said milk supply conduit, said pipe projecting straight downwardly from the upper end thereof and outwardly through the receiver bottom into the moisture trap; and means connected to the upper portion of the moisture trap for applying suction thereto.

2. Milking machine construction comprising, in combination: a receiver consisting of a hollow container having an effluent opening formed in the bottom thereof and an upper opening; a cover member hermetically sealing said upper opening; a milk supply conduit from a milk source feeding downwardly into the receiver; a straight vertically oriented vacuum pipe extending through the bottom of the receiver, the pipe terminating upwardly in the upper portion of the receiver and spaced laterally from said supply conduit and extending downwardly through the bottom of the receiver; a moisture trap beneath the receiver comprising an enclosed chamber, into which the vacuum pipe projects; and means for applying suction to the moisture trap chamber.

References Cited in the file of this patent

UNITED STATES PATENTS 2,730,071    Merritt et al. _____ Jan. 10, 1956